United States Patent [19]

Yamamura

[11] 4,141,606
[45] Feb. 27, 1979

[54] ROTATING ANODE SUPPORTING STRUCTURE FOR AN X-RAY TUBE

[75] Inventor: Toshio Yamamura, Yokohama, Japan

[73] Assignee: Tokyo Shibaura Electric Co., Ltd., Kawasaki, Japan

[21] Appl. No.: 736,494

[22] Filed: Oct. 28, 1976

[30] Foreign Application Priority Data

Nov. 4, 1975 [JP] Japan .................. 50-149136[U]

[51] Int. Cl.$^2$ .................. F16C 27/08; H01J 35/00
[52] U.S. Cl. .................. 308/140; 313/60; 308/197; 308/189 R
[58] Field of Search .................. 308/189 A, 189 R, 194, 308/175, 197, 140, 144, 146; 313/60

[56] References Cited

U.S. PATENT DOCUMENTS

| | | | |
|---|---|---|---|
| 2,430,800 | 11/1947 | Atlee | 313/60 |
| 2,711,356 | 6/1955 | Ensinger | 308/189 R X |
| 2,935,364 | 5/1960 | Smith | 308/189 R |
| 3,561,829 | 2/1971 | Heldt | 308/189 R |
| 3,765,735 | 10/1973 | Bourgain et al. | 308/140 |

FOREIGN PATENT DOCUMENTS

500270 6/1930 Fed. Rep. of Germany .......... 308/197

Primary Examiner—Allen N. Knowles
Assistant Examiner—Edward M. Wacyra
Attorney, Agent, or Firm—Cushman, Darby & Cushman

[57] ABSTRACT

A rotating anode supporting structure comprising a pair of radial bearings which support a rotary shaft rotating at a high speed. One side face of a fixed outer race of each bearing abuts against one side face of a first annular member. The other side face of the first annular member is of concave shape, such as inverted frustoconical shape, and abuts against one side face of a second annular member movable in both axial and radial directions, one side face of the second annular member being of a partial spherical shape, namely convex shape. The partial spherical face abuts against the inclined face. Thus, when a pushing force is applied to the convex member, the partial spherical face moves in both axial and radial directions until the center of the imaginary sphere including the partial sphere face is positioned on the axis, the bearing thereby enabling the concave member to push the bearing uniformly, resulting in the mounting of the bearing free from inclination.

2 Claims, 8 Drawing Figures

ROTATING ANODE SUPPORTING STRUCTURE FOR AN X-RAY TUBE

BACKGROUND OF THE INVENTION

This invention relates to an X-ray tube, more particularly, to a rotating anode supporting structure for an X-ray tube.

The appended FIG. 1 schematically shows a rotating anode X-ray tube 10 of a general type. It is seen that a glass envelope 12 of an X-ray tube 10 houses a cathode stem 14 and a rotating anode 16 facing the cathode stem 14. Thermoelectrons emitted from a filament 18 of the cathode stem 14 run to hit a target 20 of the rotating anode 16 resulting in heating of the target 20. For dissipation of the heat, a rotary shaft 22 having the target 20 fixed to one end thereof is rotated at such a high speed as 3000 to 12000 RPM. Accordingly, a pair of radial bearings rotatably supporting the rotary shaft 22 are heated to such a high temperature as to cause thermal deformation of the bearings. This presents a serious problem because it is very important that the axis of the rotary shaft 22 perfectly coincide with the axis of each bearing. It follows that a rotating anode supporting structure should be capable of adjusting the axes to coincide with each other even when the bearings are thermally deformed.

Known is a rotating anode supporting structure in which the tapered tip of each of three set screws engaged with the internally threaded holes of a fixed annular element of cylinder surrounding a non-rotatable outer race of a radial bearing is allowed to abut against the edge of the outer race. In the supporting structure of this type, however, each of the three set screws makes a point-contact with the edge of the outer race of the bearing. Obviously, it is imperative to arrange that each of these set screws push the edge of the outer race with equal force in order to keep the axis of the bearing perfectly coincided with the axis of the rotary shaft. Needly to say, such arrangement is extremely difficult to make. In addition, the supporting structure mentioned above is incapable of adjusting the inclination of the bearing caused by thermal deformation thereof.

Also known is a supporting structure of a rotating anode, in which a tubular nut provided with an externally threaded portion engaged with an internally threaded portion formed in the inner wall of a fixed annular element or cylinder surrounding the outer race of a bearing is allowed to push the outer race of the bearing. In this case, the flat surface at the end of the tubular nut is brought into direct contact with the outer race, rendering it very difficult for the tubular nut to push the outer race uniformly. It follows that the bearing tends to tilt and, thus, the axis of the bearing fails to coincide with the axis of the rotary shaft, rendering it very difficult to assemble satisfactorily the supporting structure. In addition, the supporting structure of this type also fails to adjust the inclination of the bearing caused by thermal deformation thereof.

SUMMARY OF THE INVENTION

It is an object of the invention to provide a rotating anode supporting structure for an X-ray tube capable of permitting the axis of a bearing to coincide with the axis of a rotary shaft and of readily adjusting the inclination of the bearing caused by thermal deformation.

According to the preferred embodiment of this invention, provided is an annular member, one side face thereof abutting against the non-rotatable outer race of a radial bearing and the other side face being of a concave shape. Also provided is another annular member having a convex face. The convex member is movable in both axial and radial directions. It follows that, when the convex member has been pushed by a tubular nut having an externally threaded portion, the convex face makes a linear contact with the inclined of the concave member and slides in the axial direction on the inclined face until the axes of these members are allowed to coincide with each other. When the coincidence has taken place, the convex face makes a circular linear contact with the inclined face, the center of the circle being on the common axis of the annular members. In this case, the outer race of the bearing is uniformly pushed by the concave member resulting in that the bearing is not inclined. The circular linear contact between the convex face and the inclined face produces an advantage that the inclination of the bearing caused by thermal deformation is automatically corrected.

Other objects, features and advantages of this invention will become apparent as the description thereof proceeds when considered in connection with the accompanying drawings.

DETAILED DESCRIPTION OF THE PREFERRED EMBODIMENTS

Figure 2:
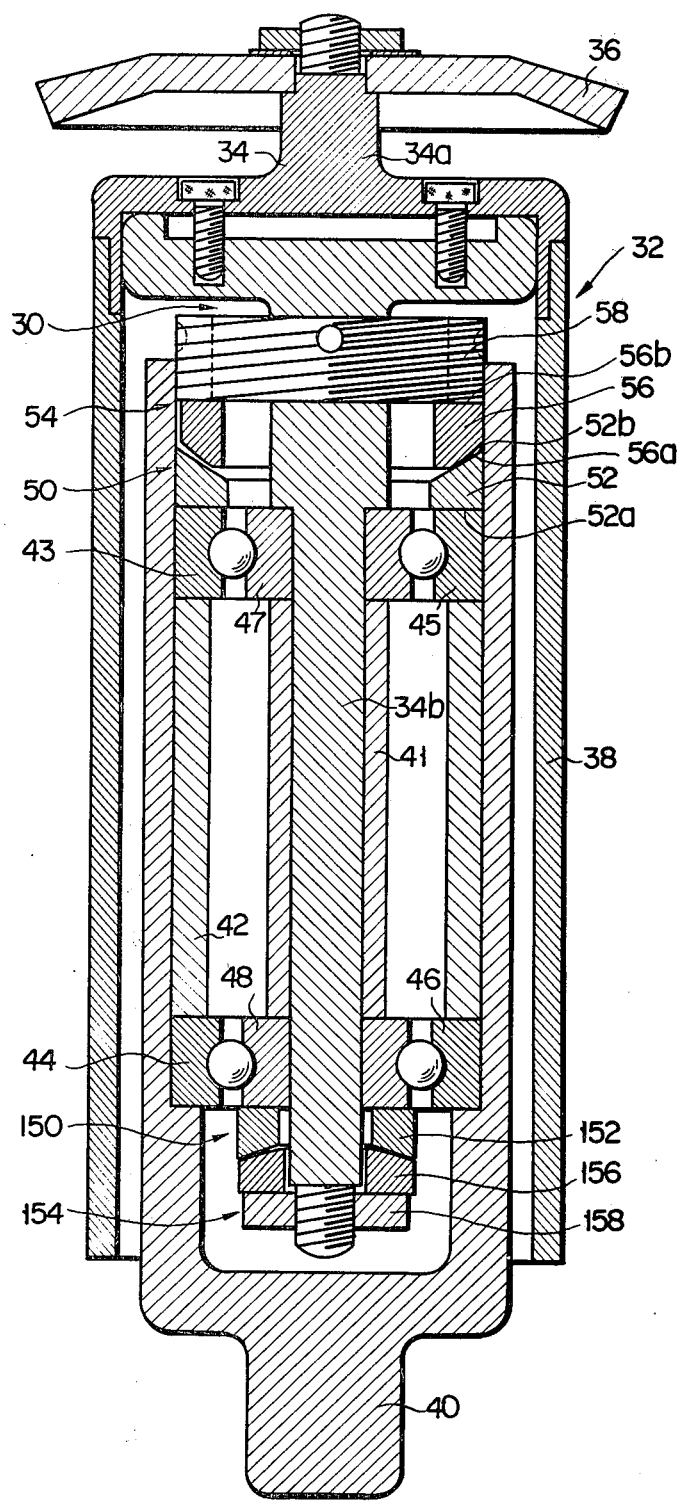
FIG. 2 is a longitudinal sectional view of a rotating anode supporting structure for an X-ray tube according to a preferred embodiment of this invention.

FIG. 2 show a rotating anode supporting structure 30 for an X-ray tube according to a preferred embodiment of this invention. A rotary shaft 34 of a rotating anode 32 is threaded at the ends and a target 36 is fixed to the rotary shaft 34 by engaging a nut with the thread formed at one end of the rotary shaft 34. Further, a skirt-like rotor 38 is formed integrally with the rotary shaft 34 so as to dissipate the heat transmitted from the target 36 to the rotary shaft. In the embodiment of FIG. 2, a first shaft portion 34a to which is fixed the target 36 is fixed by bolts to a second shaft portion 34b rotatably supporting radial bearings of the supporting structure 30, thereby forming the rotary shaft 34. Namely, the rotary shaft 34 consists of the first shaft portion 34a and the second shaft portion 34b. The second shaft portion 34b is supported by the supporting structure 30 within a fixed basic element, for example, a cylinder 40.

The supporting structure 30 for an X-ray tube comprises a pair of radial ball bearings 43, 44 separated from each other by an inner sleeve 41 and an outer sleeve 42. Other races 45, 46 of the radial bearings 43, 44 are fitted within the cylinder 40, and the inner races 47, 48 within the second shaft portion 34b. One side face 52a of the annular member 52 of a first annular means 50 abuts against the fixed outer race 45 of the bearing 43. Further, a second annular means 54 is disposed adjacent to the first annular means 50. The second annular means 54 comprises an annular member 56 movable in both axial and radial directions and a tubular nut 58 engaged with an internally threaded portion formed in the inner wall of the cylinder 40.

Between the first and second annular means 50 and 54 is disposed a centering assembly including a convex means having a partial spherical face and a concave means having a face downwardly inclined toward the axis of the rotary shaft 34. The convex means abuts against the concave means, thereby enabling the center of the imaginary sphere including the partial sphere of the convex means to be positioned on the axis of the radial bearing 43. As seen in the drawing, the other side face 52b of the annular member 52 constitutes the inclined face of the concave means. On the other hand, one side face 56a of the annular member 56 constitutes the partial spherical face of the convex means. In short, the inclined face of the concave means faces the partial spherical face of the convex means. It is seen that the other side face 56b of the annular member 56 is fitted within the tubular nut 58.

If the tubular nut 58 is moved downward by a union spanner (not shown) so as to push the annular member 56, the pushing force is transmitted to the annular member 52 through the partial spherical face 56a and the inclined face 52b.

Figure 1:
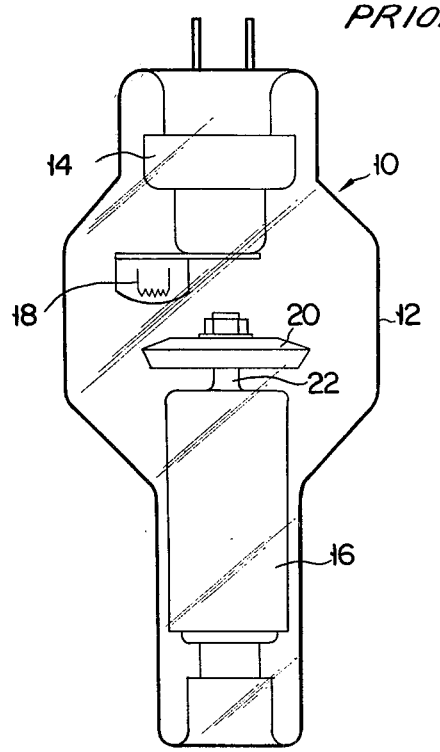
FIG. 1 is a schematic elevational view of a well-known rotating anode X-ray tube.
Figure 3:
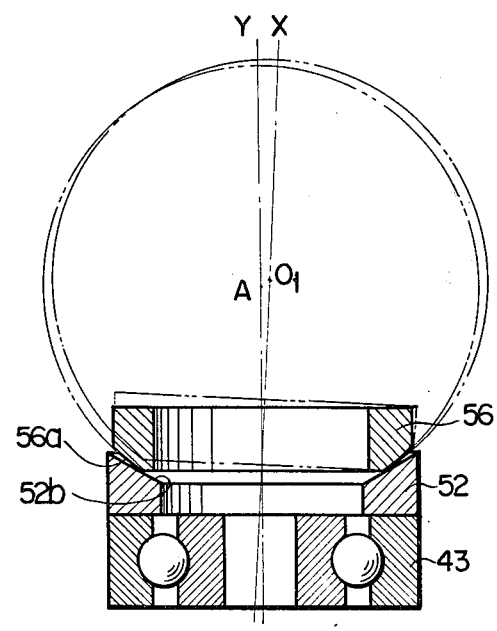
FIG. 3 shows the relationship between annular members having a convex face and a concave face.

FIG. 3 is intended to explain how the axes of the radial bearing 43 and the rotary shaft 34 are perfectly coincided. Suppose the annular member 56 is inclined to render its axis X deviant from an axis Y of the bearing 43 as shown by one-dot chain line; in other words the center $O_1$ of the imaginary sphere including the partial sphere formed by the spherical face 56a of the annular member 56 is not positioned on the axis Y. In this case, the pushing force of the nut 58 causes the partial spherical face 56a to slide on the inclined face 52b in both axial and radial directions until the center $O_1$ moves to a point A on the axis Y. When the center $O_1$ has moved to the point A, the faces 52b and 56a make a circular linear contact, with the center of the circle positioned on the axis Y. Accordingly, a uniformly distributed pushing force is transmitted to the annular member 52, permitting assembling the supporting structure 30 such that the bearing 43 is not inclined and, thus, the axis of the bearing 43 perfectly coincides with the axis of the rotary shaft 34. Even if the bearing 43 and the annular members 52, 56 have been thermally deformed by the heat generated by the rotation of the rotary shaft 34 after the assembly, the supporting structure 30 can be automatically compensated to permit the axes of the bearing and the rotary shaft to be coincided with each other.

Returning to FIG. 2, a first annular means 150, a second annular means 154 and another centering assembly are disposed downward of the lower radial bearing 44. However, an annular member 152 of the first annular means 150 abuts against the rotatable inner race 48 of the bearing 44 and a tubular nut 158 of the second annular means 154 is engaged with the internally threaded portion formed at the end of the second shaft portion 34b. As is the case with the centering assembly for the radial bearing 43, the centering assembly for the radial bearing 44 includes an inclined concave face formed on an annular member 152 and a partial spherical convex face formed on another annular member 156.

Figure 4:
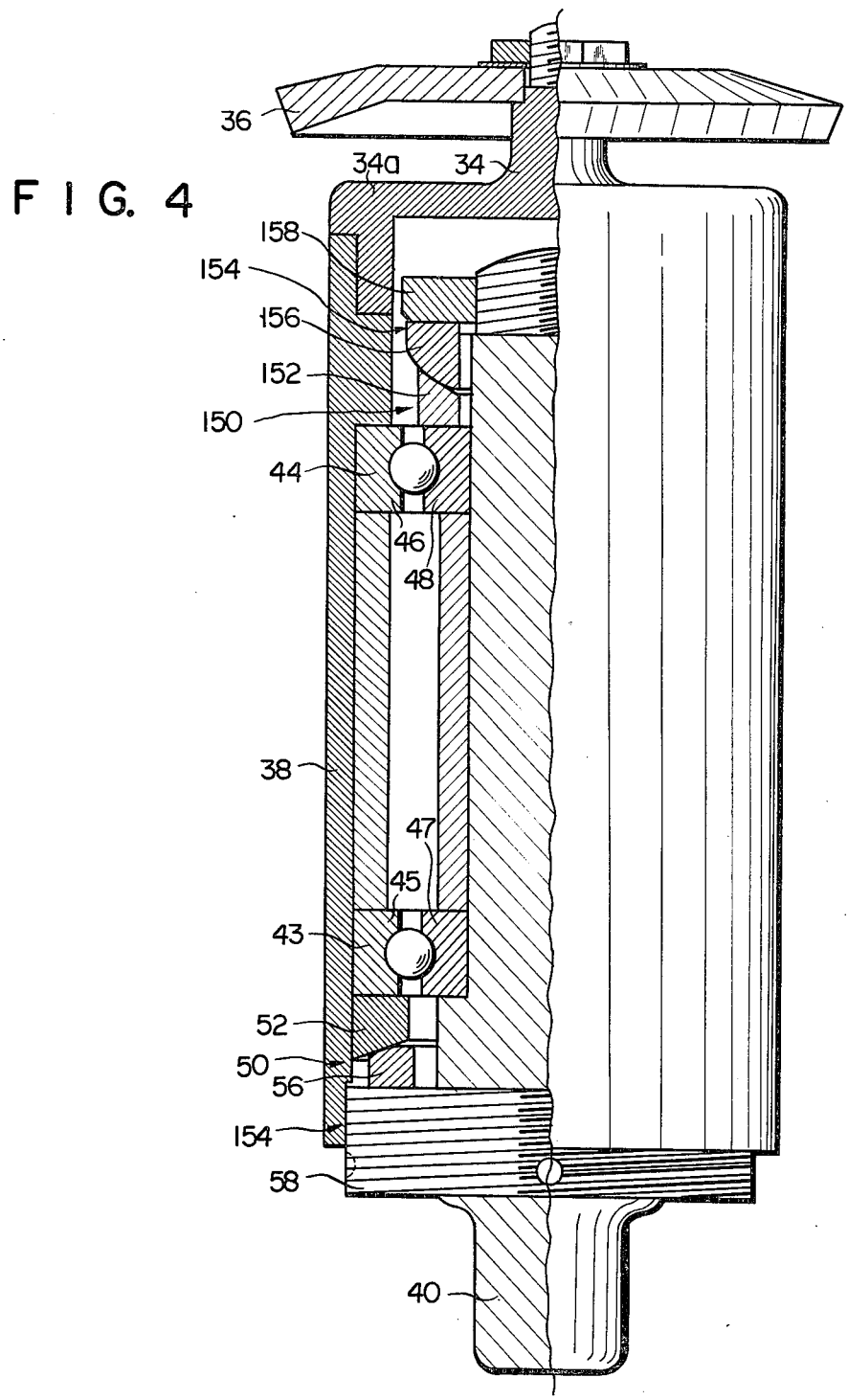
FIG. 4 is an elevational view, partly broken away, of a rotating anode supporting structure for an X-ray tube according to another embodiment of this invention.

FIG. 4 shows a rotating anode supporting structure according to another embodiment of this invention. In this case, the rotary shaft 34 is made of the first shaft portion 34a alone to which the target 36 is fixed. Further, the radial bearings 43, 44 are mounted between the skirt-like rotor 38 of the first shaft portion 34a and the fixed base element or fixed solid shaft 40. Still further, the inner races 47, 48 are non-rotatable and the outer races 45, 46 rotatable.

Figure 5A:
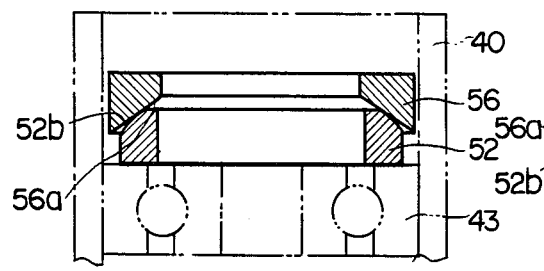
FIGS. 5a to 5d are partly longitudinal sectional views showing rotating anode supporting structures according to still other embodiments of this invention.
Figure 5D:
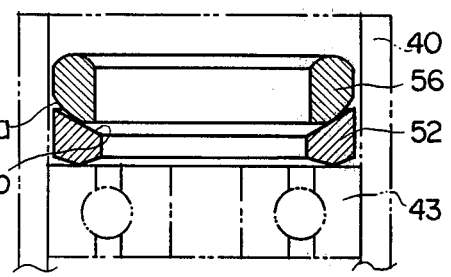

FIGS. 5a and 5d show centering assemblies according to further embodiments of this invention. As shown in FIG. 5a, the partial spherical face of the convex means may be formed on the other side face 52b of the annular member 52, with the inclined face of the concave means formed on one side face 56a of the annular member 56.

Figure 5B:
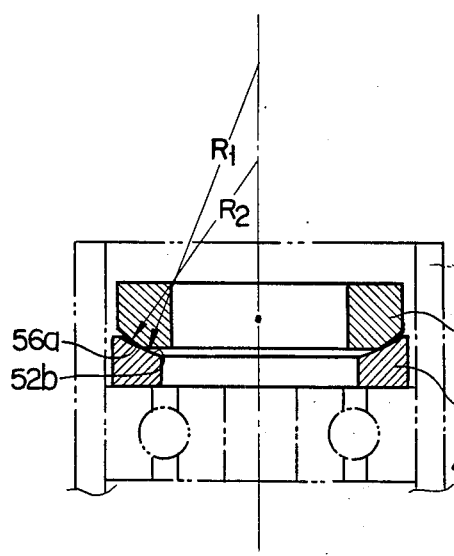

The inclined face of the concave means is not necessarily straight-lined in cross section, but the face may be made partially spherical as shown in FIG. 5b. In this case, the curvature $R_1$ of the partial sphere formed on the other side face 52b of the annular member 52 should naturally be larger than the curvature $R_2$ of the partial sphere formed on one side face 56a of the annular member 56.

Figure 5C:
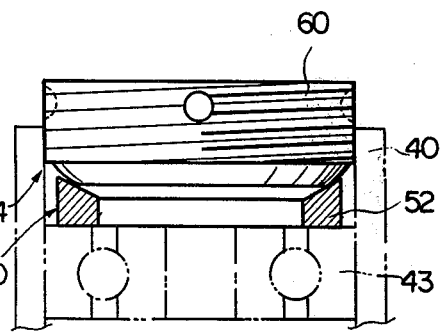

In the embodiments described previously, the second annular means 54 includes the annular member 56 and the tubular nut 58. But, the second annular means 54 may be formed of a single element 60 enabled to play the roles of both the annular member 56 and the tubular nut 58 as shown in FIG. 5c. In this case, the annular member 52 of first annular means 50 must be disposed apart from the cylinder 40 so as to enable the annular member 52 to be moved in the radial direction.

Further, one side face 52a of the annular member 52 abutting against the bearing 43 and the other face 56b of the annular member 56 engaged with the nut 58 need not be flat. As shown in FIG. 5d, these faces may be semicircular or V-shaped in cross section. In this case, the pushing force of the nut 58 is more uniformly transmitted to the outer race of the bearing 43.

As described in detail, this invention utilizes a centering assembly including a partial spherical face and an inclined face, thereby permitting a uniformly distributed pushing face to be transmitted to a bearing all the time. Naturally, the bearing is prevented from being inclined. In addition, thermal deformation of the bearing caused by a high speed rotation of a rotary shaft can be readily compensated by the circular linear contact between the partial spherical face and the inclined face.

The invented rotating anode supporting structure for an X-ray tube may be arranged to prevent inclination of a plurality, for example, two, of radial bearings as shown in FIGS. 2 and 4 or to prevent inclination of only one of a plurality of bearings.

The embodiments of the accompanying drawings are simply intended to explain the technical idea of this invention. Needless to say, various modifications are available within the scope of this invention.

What is claimed is:

1. A rotating anode supporting structure for an X-ray tube, comprising:
   a radial bearing mounted between a rotary shaft and a fixed base element, the rotary shaft rotating together with a target and provided with an integrally formed skirt-like rotor;
   a first annular means having one side face abutting against one side face of one of the races of the bearing and the other side face forming a concave means with an inclined face of frusto-conical shape; and a second annular means including an annular member movable in the radial direction, one side face of the annular member abutting against the other side face of the first annular means forming a convex means having a partial spherical face and permitting a pushing force of the second annular means to be transmitted with uniform force distribution to the bearing through the first annular means, said second annular means further including a tubular nut having the outer circumference provided with an externally threaded portion, said tubular nut being rotated to provide said pushing force to the other side face of the annular member of the second annular means.

2. The supporting means according to claim 1, wherein each of one side face of the first annular means and the other side face of the annular member of the second annular means is shaped to permit a linear contact with the member abutting thereagainst.

* * * * *